(12) United States Patent
Fasola et al.

(10) Patent No.: US 12,062,135 B2
(45) Date of Patent: Aug. 13, 2024

(54) THREE-DIMENSIONAL MOTION GRID SYSTEM FOR AUTONOMOUS VEHICLE PERCEPTION

(71) Applicant: GM Cruise Holdings LLC, San Francisco, CA (US)

(72) Inventors: Juan Fasola, San Francisco, CA (US); Shreyans Kushwaha, Burlingame, CA (US); Eugene Lo, Redwood City, CA (US); Xiaoyu Zhou, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 42 days.

(21) Appl. No.: 17/841,439

(22) Filed: Jun. 15, 2022

(65) Prior Publication Data

US 2023/0410423 A1    Dec. 21, 2023

(51) Int. Cl.
*G06T 17/05* (2011.01)
*B60W 60/00* (2020.01)
*G01S 17/89* (2020.01)
*G01S 17/931* (2020.01)
*G06T 7/20* (2017.01)
*G06T 15/06* (2011.01)

(52) U.S. Cl.
CPC ....... *G06T 17/05* (2013.01); *B60W 60/00253* (2020.02); *G01S 17/89* (2013.01); *G01S 17/931* (2020.01); *G06T 7/20* (2013.01); *G06T 15/06* (2013.01); *B60W 2420/408* (2024.01); *G06T 2207/10028* (2013.01); *G06T 2207/30252* (2013.01); *G06T 2210/52* (2013.01); *G06T 2210/56* (2013.01)

(58) Field of Classification Search
None
See application file for complete search history.

(56) References Cited

U.S. PATENT DOCUMENTS

| | | | |
|---|---|---|---|
| 8,537,338 B1 * | 9/2013 | Medasani | G01S 7/4802 382/104 |
| 10,032,276 B1 * | 7/2018 | Liu | G06T 7/292 |
| 10,571,926 B1 * | 2/2020 | Zhang | G05D 1/0274 |
| 2006/0089763 A1 * | 4/2006 | Barrett | G05D 1/0061 701/2 |
| 2009/0018712 A1 * | 1/2009 | Duncan | G09B 19/167 701/2 |
| 2010/0034422 A1 * | 2/2010 | James | G06T 7/246 382/103 |
| 2017/0369051 A1 * | 12/2017 | Sakai | B60W 10/20 |
| 2018/0341263 A1 * | 11/2018 | Rust | G01S 13/74 |

(Continued)

*Primary Examiner* — Jason A Pringle-Parker

(57) ABSTRACT

A method is described and includes receiving a frame of point cloud data from at least one onboard light detection and ranging (LIDAR) sensor of a vehicle; discarding points of the received frame of point cloud data that are outside a defined geographic area around the vehicle; and, subsequent to the discarding, performing ray tracing in connection with the remaining points of the received frame of point cloud data. The method may further include characterizing an occupancy condition of each of a plurality of cells of a three-dimensional (3D) grid corresponding to the defined geographic area based on the ray tracing of the received frame of point cloud data, wherein the 3D grid corresponds to the received frame of point cloud data.

16 Claims, 9 Drawing Sheets

(56) References Cited

U.S. PATENT DOCUMENTS

| | | | |
|---|---|---|---|
| 2019/0101649 A1* | 4/2019 | Jensen | G05D 1/0257 |
| 2019/0138823 A1* | 5/2019 | Doria | G06V 20/588 |
| 2019/0212749 A1* | 7/2019 | Chen | B62D 15/02 |
| 2019/0258251 A1* | 8/2019 | Ditty | G05D 1/0248 |
| 2020/0182969 A1* | 6/2020 | He | G01S 7/4808 |
| 2020/0231176 A1* | 7/2020 | Motoyama | G01S 7/4816 |
| 2020/0393268 A1* | 12/2020 | Schroeter | G01C 21/387 |
| 2021/0323572 A1* | 10/2021 | He | G01C 21/3848 |

* cited by examiner

THREE-DIMENSIONAL MOTION GRID SYSTEM FOR AUTONOMOUS VEHICLE PERCEPTION

TECHNICAL FIELD OF THE DISCLOSURE

The present disclosure relates generally to rideshare services provided using autonomous vehicles and, more specifically, to techniques for a three-dimensional (3D) motion grid system for use in autonomous vehicle perception and planning.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

DESCRIPTION OF EXAMPLE EMBODIMENTS OF THE DISCLOSURE

Overview

Figure 1:
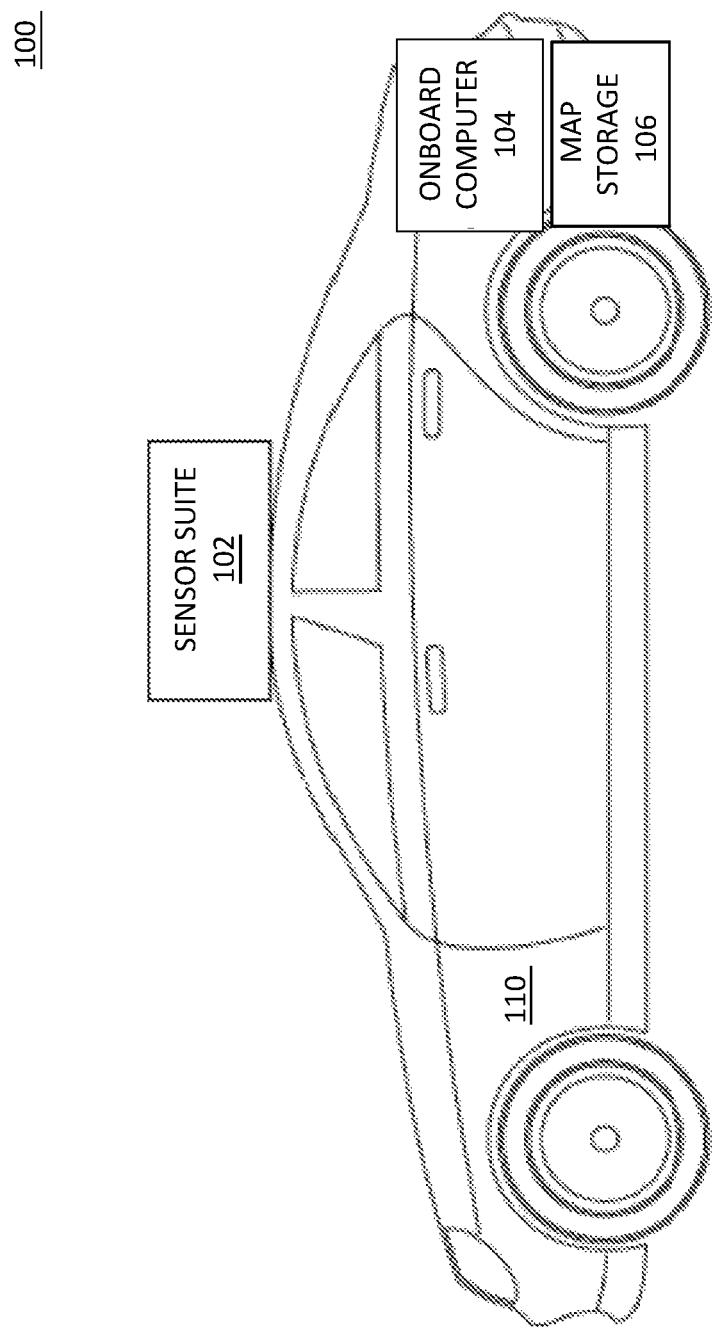
FIG. 1 is a diagram illustrating an example autonomous vehicle according to some embodiments of the present disclosure.

The systems, methods, and devices of this disclosure each have several innovative aspects, no single one of which is solely responsible for all of the desirable attributes disclosed herein. Details of one or more implementations of the subject matter described in this Specification are set forth in the description below and the accompanying drawings.

Given the numerous advantages of ride hail, rideshare, and delivery services (which services may be collectively and/or interchangeably referred to herein simply as "rideshare services" whether for a single user/passenger, multiple users/passengers, and/or one or more items for delivery) provided by autonomous vehicles, it is anticipated that autonomous vehicle rideshare services will soon become the ubiquitous choice for various user transportation and delivery needs, including but not limited to school commutes, airport transfers, long distance road trips, and grocery and restaurant deliveries, to name a few.

In accordance with features of embodiments described herein, a 3D motion grid system processes a 3D point cloud from multiple light detection and ranging sensors (LIDARs) to discretize it in various top-down bird's eye view (BEV) grids for every frame. Use of at least two LIDARs positioned on a roof of the autonomous vehicle to generate the point cloud helps to minimize the effects of blindspots of each of the LIDARs on the point cloud; additional LIDARs may be included to further reduce blindspot impact. In one embodiment, ray tracing is performed on the point cloud in order to characterize each of a plurality of grid cell (which corresponds to a particular point or location in space) as, for example, "freespace," "occupied," "ground," "unknown," and/or "overhang." Characterization may also indicate a height above ground of each grid cell, which information may be provided in the LIDAR point cloud. A temporal rolling window of the grids may be maintained to keep track of the most recent LIDAR data received by the AV. Using the temporal grid data combined with movement of the AV, motion classification may be performed for each grid cell. Motion classification may include such information as type of motion observed (e.g., slow, normal, rapid) and confidence levels for the observed motion type. For example, freespace left behind an object can confirm motion of the object (speed and direction). Additionally, the 3D motion grid system may assist in classifying objects as floating (e.g., an overhanging branch) or flying (e.g., a low-flying drone) as well.

An output of the 3D motion grid system may include information regarding occupancy and motion of the various grid cells (which in the 3D case may also be referred to herein as "voxels"), which information may be advantageously used by downstream consumers (e.g., a collision imminent detection (CID) node) to identify objects and their direction and approximate speed of travel and to assist the autonomous vehicle in responding to such detected objects. In particular environments, the 3D motion grid system executes in real time by performing computations on a graphics processing unit (GPU) of the autonomous vehicle. The data and processing (e.g., parallel processing threads) used and produced by the 3D motion grid system may be optimized for use with a particular type GPU. The 3D grid may be further processed to produce a two-dimensional (2D) occupancy grid for use by downstream consumers as well.

Particular embodiments are optimized for use by a GPU, which in some embodiments may be implemented as a Compute Unified Device Architecture (CUDA) GPU, to generate and process the 3D motion grid for the entire point cloud sufficiently quickly to enable real time operation. The output of the 3D motion grid system may be used as an input to both a primary tracker and a secondary tracker of the autonomous vehicle tracking system.

During freespace planning, in which the autonomous vehicle determines where there is unoccupied space into which it is safe for the autonomous vehicle to move, a 3D occupancy grid may be computed at different instances of time and compared with one another on a cell-by-cell basis substantially in real time. Implementation allows for parallelization across multiple threads such that the grid space can be computed highly efficiently on a 32-bit floating point processor architecture such as employed by a CUDA GPU.

As will be appreciated by one skilled in the art, aspects of the present disclosure, in particular aspects of embodiments described herein, may be embodied in various manners (e.g., as a method, a system, an autonomous vehicle, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings, in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the drawings, a particular number and arrangement of structures and components are presented for illustrative purposes and any desired number or arrangement of such structures and components may be present in various embodiments. Further, the structures shown in the figures may take any suitable form or shape according to material properties, fabrication processes, and operating conditions. For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., 110a-110e), such a collection may be referred to herein without the letters (e.g., as "110").

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y. The terms "substantially," "close," "approximately," "near," and "about," generally refer to being within +/−20% of a target value (e.g., within +/−5 or 10% of a target value) based on the context of a particular value as described herein or as known in the art.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example Autonomous Vehicle

FIG. 1 is a diagram 100 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 may be part of a fleet of vehicles for picking up passengers and/or packages and driving to selected destinations. The autonomous vehicle 110 may be configured for ride management by an event host.

The sensor suite 102 includes localization and driving sensors. For example, the sensor suite may include one or more of photodetectors, cameras, radio detection and ranging (RADAR), SONAR, LIDAR, GPS, inertial measurement units (IMUS), accelerometers, microphones, strain gauges, pressure monitors, barometers, thermometers, altimeters, wheel speed sensors, and a CV system. The sensor suite 102 continuously monitors the autonomous vehicle's environment and, in some examples, sensor suite 102 data is used to detect selected events. In particular, data from the sensor suite can be used to update a map with information used to develop layers with waypoints identifying selected events, the locations of the encountered events, and the frequency with which the events are encountered at the identified location. In this way, sensor suite 102 data from many autonomous vehicles can continually provide feedback to the mapping system and the high-fidelity map can be updated as more and more information is gathered.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. Based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

The autonomous vehicle 110 is preferably a fully autonomous automobile but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, an airplane, a bike, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

The autonomous vehicle 110 may include a map storage 106 for storing map data. The autonomous vehicle 110 may use the map data in various driving decisions, e.g., in finding optimal routes, in support of detecting objects along a route such as traffic lights, or for predicting behavior of other road users and planning autonomous vehicle behavior.

Example Autonomous Vehicle Fleet

Figure 2:
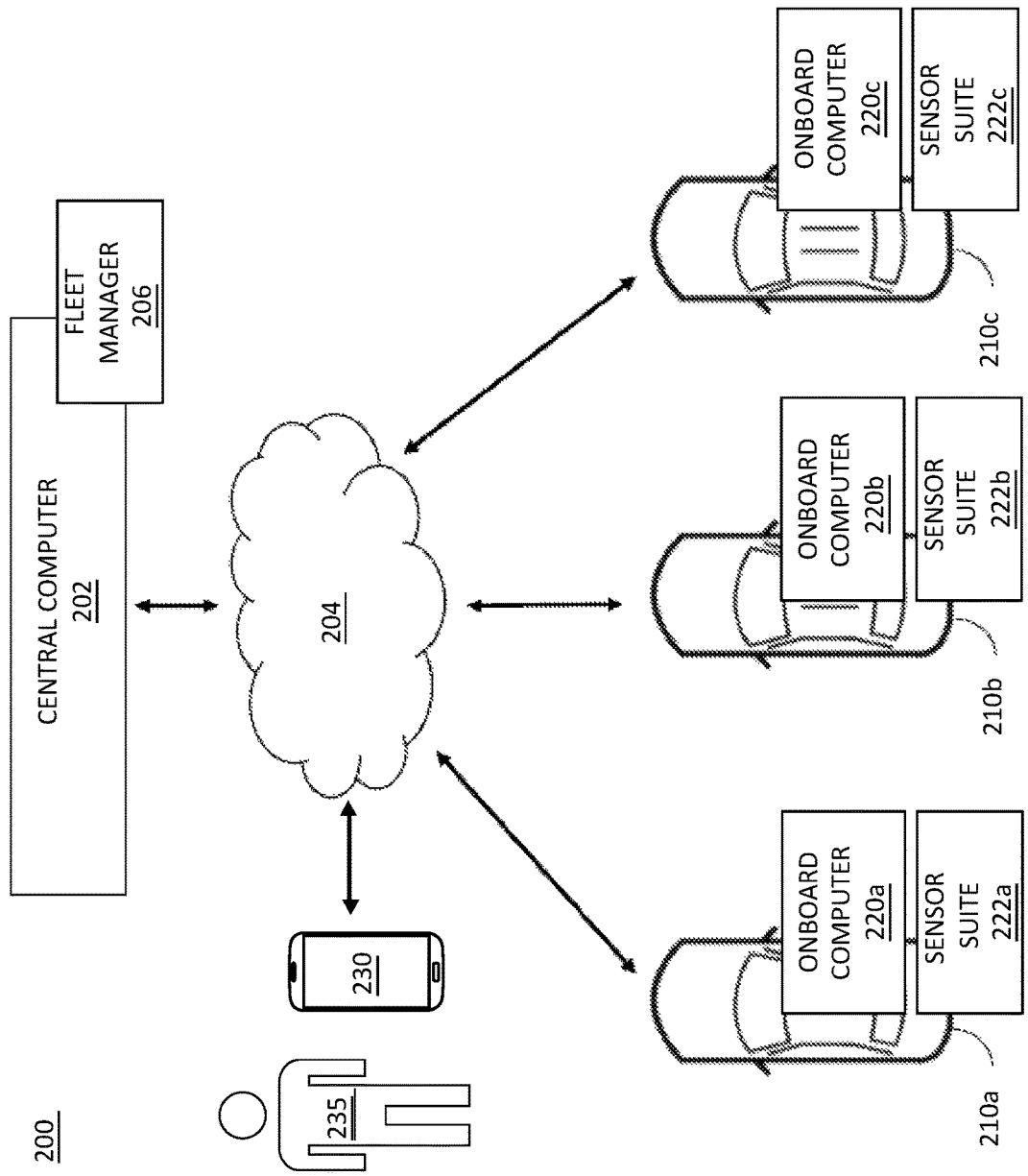
FIG. 2 is a diagram illustrating an example fleet of autonomous vehicles according to some embodiments of the present disclosure.

FIG. 2 is a diagram 200 illustrating a fleet of autonomous vehicles 210a, 210b, 210c in communication with a central computer 202 according to some embodiments of the disclosure. As shown in FIG. 2, the vehicles 210a-210c may communicate wirelessly with a central computer 202 and a cloud 204. The central computer 202 may include a fleet management system 206, which may include a routing coordinator and a database of information from the vehicles 210a-210c in the fleet. Each vehicle 210a-210c can include respective onboard computer 220a-220c and sensor suites 222a-222c, which can be similar to the onboard computer 104 and sensor suites 102 of FIG. 1.

The central computer 202 (and more particularly the fleet management system 206) may receive rideshare service requests for one of the autonomous vehicles 210 from user devices 230. Autonomous vehicle fleet routing refers to the routing of multiple vehicles in a fleet. In some implementations, autonomous vehicles communicate directly with each other. For example, a user 235 may make a request for rideshare service using a mobile app executing on the user device 230. The user device 230 may transmit the request directly to the fleet management system 206. The fleet management system 206 dispatches one of the autonomous vehicles 210a-210c to carry out the service request. When the dispatched one of the autonomous vehicles 210a-210c arrives at the pick-up location (i.e., the location at which the user is to meet the autonomous vehicle to begin the rideshare service), the user may be notified by the mobile app to meet the autonomous vehicle.

When a ride request is received from a passenger, the routing coordinator may select an autonomous vehicle 210a-210c to fulfill the ride request and generates a route for the autonomous vehicle 210a-210c. As described herein, in some examples, the routing coordinator selects more than one autonomous vehicle 210a-210c to fulfill the ride request. The generated route includes a route from the autonomous vehicle's present location to the pick-up location, and a route from the pick-up location to the final destination. In some examples, the generated route includes a route from the pick-up location to a selected waypoint, and a route from the selected waypoint to the final destination. In some examples, a first autonomous vehicle 210a drives the route to the waypoint and a second autonomous vehicle 210b drives the route from the waypoint to the final destination. In various examples, the route includes multiple waypoints and multiple autonomous vehicles. In some implementations, the central computer 202 communicates with a second fleet of autonomous vehicles, and a vehicle from the second fleet of autonomous vehicles drives the route from the waypoint to the final destination.

Each vehicle 210a-210c in the fleet of vehicles may communicate with a routing coordinator. Information gathered by various autonomous vehicles 210a-210c in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest time route for each autonomous vehicle. In some implementations, the routing coordinator uses collected position data to generate a best route for an autonomous vehicle in view of one or more traveling preferences and/or routing goals.

The routing coordinator uses map data to select an autonomous vehicle from the fleet to fulfill a ride request. In some implementations, the routing coordinator sends the selected autonomous vehicle the ride request details, including pick-up location and destination location, and an onboard computer (e.g., onboard computer 220a, 220b, or 220c) on the selected autonomous vehicle generates a route and navigates to the destination. In some examples, the routing coordinator also sends the selected vehicle one or more stops, including a charging station stop, for the autonomous vehicle to recharge. In some examples, the routing coordinator sends a first vehicle the pick-up location and a waypoint location, and the routing coordinator sends a second vehicle the waypoint location and the destination location, such that the passenger switches vehicles mid-ride. In some implementations, the routing coordinator in the central computer 202 generates a route for each selected autonomous vehicle 210a-210c, and the routing coordinator determines a route for the autonomous vehicle 210a-210c to travel from the autonomous vehicle's current location to a first stop.

Central computer 202 may include a model trainer for training classification models used to classify objects by applying machine learning techniques to training data. Classification models may be downloaded to onboard computers 220a, 220b, 220c, for use in classifying objects encountered by the autonomous vehicle 210a, 210b, 210c.

Example Onboard Computer

Figure 3:
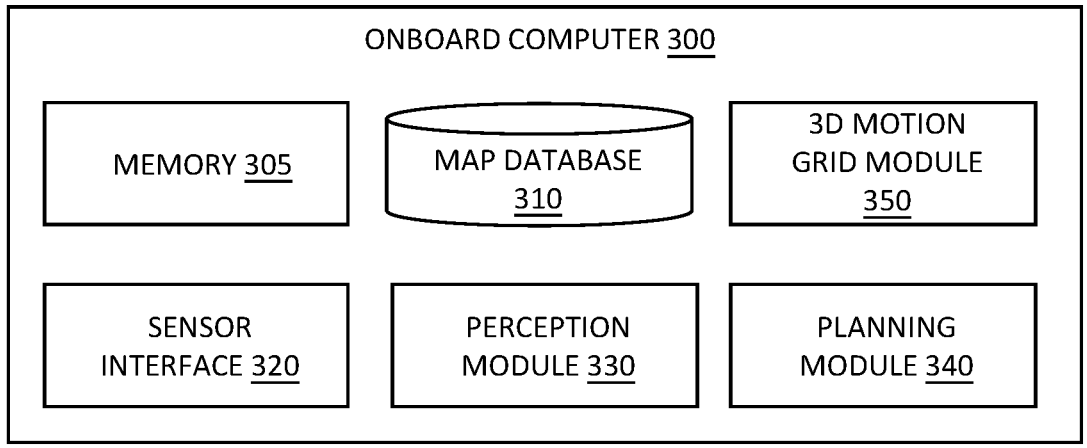
FIG. 3 is a diagram illustrating an onboard computer according to some embodiments of the present disclosure.

FIG. 3 is a block diagram illustrating an onboard computer 300, which may be used to implement onboard computer 104 (FIG. 1) and onboard computers 220 (FIG. 2) for enabling features according to some embodiments of the present disclosure. The onboard computer 300 may include memory 305, a map database 310, a sensor interface 320, a perception module 330, a planning module 340, and 3D motion grid module 350. In alternative configurations, fewer, different and/or additional components may be included in the onboard computer 300. For example, components and modules for controlling movements of the vehicles 110, 210, and other vehicle functions, and components and modules for communicating with other systems, such as central computer 202 and/or cloud 204, are not shown in FIG. 3. Further, functionality attributed to one component of the onboard computer 300 may be accomplished by a different component included in the onboard computer 300 or a different system from those illustrated.

The map database 310 stores a detailed map that includes a current environment of the vehicle. The map database 310 includes data describing roadways (e.g., locations of roadways, connections between roadways, roadway names, speed limits, traffic flow regulations, toll information, etc.) and data describing buildings (e.g., locations of buildings, building geometry, building types). The map database 310 may further include data describing other features, such as bike lanes, sidewalks, crosswalks, traffic lights, parking lots, etc.

The sensor interface 320 interfaces with the sensors in the sensor suite of the vehicle (e.g., sensor suite 140 (FIG. 1)). The sensor interface 320 may request data from the sensor suite, e.g., by requesting that a sensor capture data in a particular direction or at a particular time. The sensor interface 320 is configured to receive data captured by sensors of the sensor suite. The sensor interface 320 may have subcomponents for interfacing with individual sensors or groups of sensors of the sensor suite, such as a thermal sensor interface, a camera interface, a LIDAR interface, a RADAR interface, a microphone interface, etc.

The perception module 330 identifies objects in the environment of the vehicle. The sensor suite produces a data set that is processed by the perception module 330 to detect other cars, pedestrians, trees, bicycles, and objects traveling on or near a road on which the vehicle is traveling or stopped, and indications surrounding the vehicle (such as construction signs, traffic cones, traffic lights, stop indicators, and other street signs). For example, the data set from the sensor suite may include images obtained by cameras, point clouds obtained by LIDAR sensors, and data collected by RADAR sensors. The perception module 330 may include one or more classifiers trained using machine learning to identify particular objects. For example, a multi-class classifier may be used to classify each object in the environment of the vehicle as one of a set of potential objects, e.g., a vehicle, a pedestrian, or a cyclist. As another example, a human classifier recognizes humans in the environment of the vehicle, a vehicle classifier recognizes vehicles in the environment of the vehicle, etc.

The planning module 340 plans maneuvers for the vehicle based on map data retrieved from the map database 310, data received from the perception module 330, and navigation information, e.g., a route instructed by the fleet management system. In some embodiments, the planning module 340 receives map data from the map database 310 describing known, relatively fixed features and objects in the environment of the vehicle. For example, the map data includes data describing roads as well as buildings, bus stations, trees, fences, sidewalks, etc. The planning module 340 receives data from the perception module 330 describing at least some of the features described by the map data in the environment of the vehicle. The planning module 340 determines a pathway for the vehicle to follow. The pathway includes locations for the vehicle to maneuver to, and timing and/or speed of the vehicle in maneuvering to the locations.

The 3D motion grid module 350 may interact with other modules of the onboard computer 300 and other modules and systems to control and provide various aspects of the functionality and features of embodiments described herein and particularly as described below with reference to FIGS. 7 and 8. In particular embodiments, the 3D motion grid module may comprise a GPU having a 32-bit architecture, such as a CUDA GPU.

Example Fleet Management System

Figure 4:
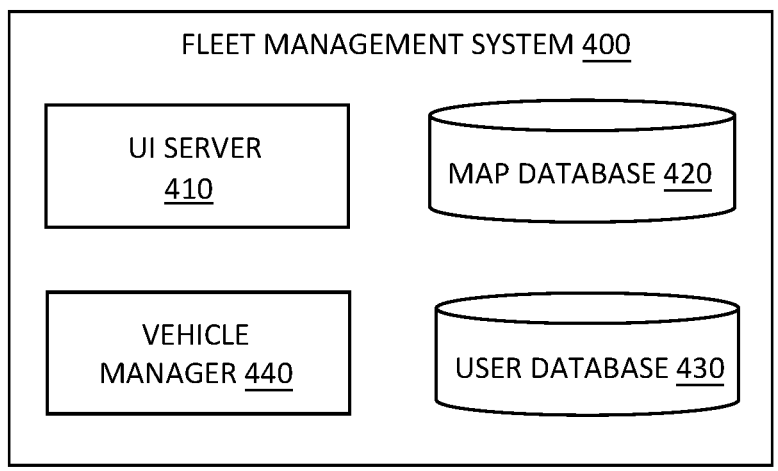
FIG. 4 is a diagram illustrating a fleet management system according to some embodiments of the present disclosure.

FIG. 4 is a block diagram illustrating a fleet management system 400, which may be implemented by central computer 202 (FIG. 2), according to some embodiments of the present disclosure. The fleet management system 400 includes a user interface (UI) server 410, a map database 420, a user database 430, and a vehicle manager 440. In alternative configurations, different, additional, or fewer components may be included in the fleet management system 400. Further, functionality attributed to one component of the fleet management system 400 may be accomplished by a different component included in the fleet management system 400 or a different system than those illustrated.

The fleet management system 400 manages a fleet of autonomous vehicles, such as autonomous vehicle 110. The fleet management system 400 may manage one or more services that provide or use the autonomous vehicles, e.g., a service for providing rides to users with the autonomous vehicles, or a service that delivers items, such as prepared foods, groceries, or packages, using the autonomous vehicles. The fleet management system 400 may select an autonomous vehicle from the fleet of autonomous vehicles to perform a particular service or other task and instruct the selected autonomous vehicle to autonomously drive to a particular location (e.g., a designated pick-up location) to pick-up a user and/or drop off an order to a user. The fleet management system 400 may select a route for the autonomous vehicle to follow. The fleet management system 400 may also manage fleet maintenance tasks, such as charging, servicing, and cleaning of the autonomous vehicle. As illustrated in FIG. 2, the autonomous vehicles may communicate with the fleet management system 400. The autonomous vehicle and the fleet management system 400 may connect over a public network, such as the Internet.

The UI server 410 is configured to communicate with client devices that provide a user interface to users. For example, the UI server 410 may be a web server that provides a browser-based application to client devices, or the UI server 410 may be a user app server that interfaces with a user app installed on client devices. The UI enables the user to access a service of the fleet management system 400, e.g., to request a ride from an autonomous vehicle, or to request a delivery from an autonomous vehicle. For example, the UI server 410 receives a request for a ride that includes an origin location (e.g., the user's current location) and a destination location, or a request for a delivery that includes a pick-up location (e.g., a local restaurant) and a destination location (e.g., the user's home address).

The map database 420 stores a detailed map describing roads and other areas (e.g., parking lots, autonomous vehicle service facilities) traversed by a fleet of autonomous vehicles, such as vehicles 210 (FIG. 2). The map database 420 includes data describing roadways (e.g., locations of roadways, connections between roadways, roadway names, speed limits, traffic flow regulations, toll information, etc.), data describing buildings (e.g., locations of buildings, building geometry, building types), and data describing other objects (e.g., location, geometry, object type), and data describing other features, such as bike lanes, sidewalks, crosswalks, traffic lights, parking lots, etc. At least a portion of the data stored in the map database 420 is provided to onboard computers of vehicles in the fleet, such as onboard computer 300 (FIG. 3), as a map database 310 (FIG. 3), described above.

The user database 430 stores data describing users of the fleet of vehicles managed by fleet management system 400. Users may create accounts with the fleet management system 400, which stores user information associated with the user accounts, or user profiles, in the user database 430. The user information may include identifying information (name, username), password, payment information, home address, contact information (e.g., email and telephone number), and information for verifying the user (e.g., photograph, driver's license number). Users may provide some or all of the user information, including user preferences regarding certain aspects of services provided by the rideshare system, to the fleet management system 400. In some embodiments, the fleet management system 400 may infer some user information from usage data or obtain user information from other sources, such as public databases or licensed data sources.

The fleet management system 400 may learn one or more home addresses for a user based on various data sources and user interactions. The user may provide a home address when setting up his account, e.g., the user may input a home address, or the user may provide an address in conjunction with credit card information. In some cases, the user may have more than one home, or the user may not provide a home address, or the user-provided home address may not be correct (e.g., if the user moves and the home address is out of date, or if the user's address associated with the credit card information is not the user's home address). In such cases, the fleet management system 400 may obtain a home address from one or more alternate sources. In one example, the fleet management system 400 obtains an address associated with an official record related to a user, such as a record from a state licensing agency (e.g., an address on the user's driver's license), an address from the postal service, an address associated with a phone record, or other publicly available or licensed records. In another example, the fleet management system 400 infers a home address based on the user's use of a service provided by the fleet management system 400. For example, the fleet management system 400 identifies an address associated with at least a threshold number of previous rides provided to a user (e.g., at least 10 rides, at least 50% of rides, or a plurality of rides), or at least a threshold number of previous deliveries (e.g., at least five deliveries, at least 60% of deliveries) as a home address or candidate home address. The fleet management system 400 may look up a candidate home address in the map database 420 to determine if the candidate home address is associated with a residential building type, e.g., a single-family home, a condominium, or an apartment. The fleet management system 400 stores the identified home address in the user database 430. The fleet management system 400 may obtain or identify multiple addresses for a user and associate each address with the user in the user database 430. In some embodiments, the fleet management system 400 identifies a current home address from multiple candidate home addresses, e.g., the most recent address, or an address that the user rides to or from most frequently and flags the identified current home address in the user database 430.

The vehicle manager 440 directs the movements of the vehicles in the fleet managed by fleet management system 400 (e.g., vehicles 210 (FIG. 2)). The vehicle manager 440 receives service requests from users from the UI server 410, and the vehicle manager 440 assigns service requests to individual vehicles. For example, in response to a user request for transportation from an origin location to a destination location, the vehicle manager 440 selects a vehicle and instructs the vehicle to drive to the origin location (e.g., a passenger or delivery pick-up location), and then instructs the vehicle to drive to the destination location (e.g., the passenger or delivery destination location). In addition, the vehicle manager 440 may instruct vehicles to drive to other locations while not servicing a user, e.g., to improve geographic distribution of the fleet, to anticipate demand at particular locations, to drive to a charging station for charging, etc. The vehicle manager 440 also instructs vehicles to return to autonomous vehicle facilities for recharging, maintenance, or storage.

Example Issues that May be Addressed by Example Embodiments

Figure 5:
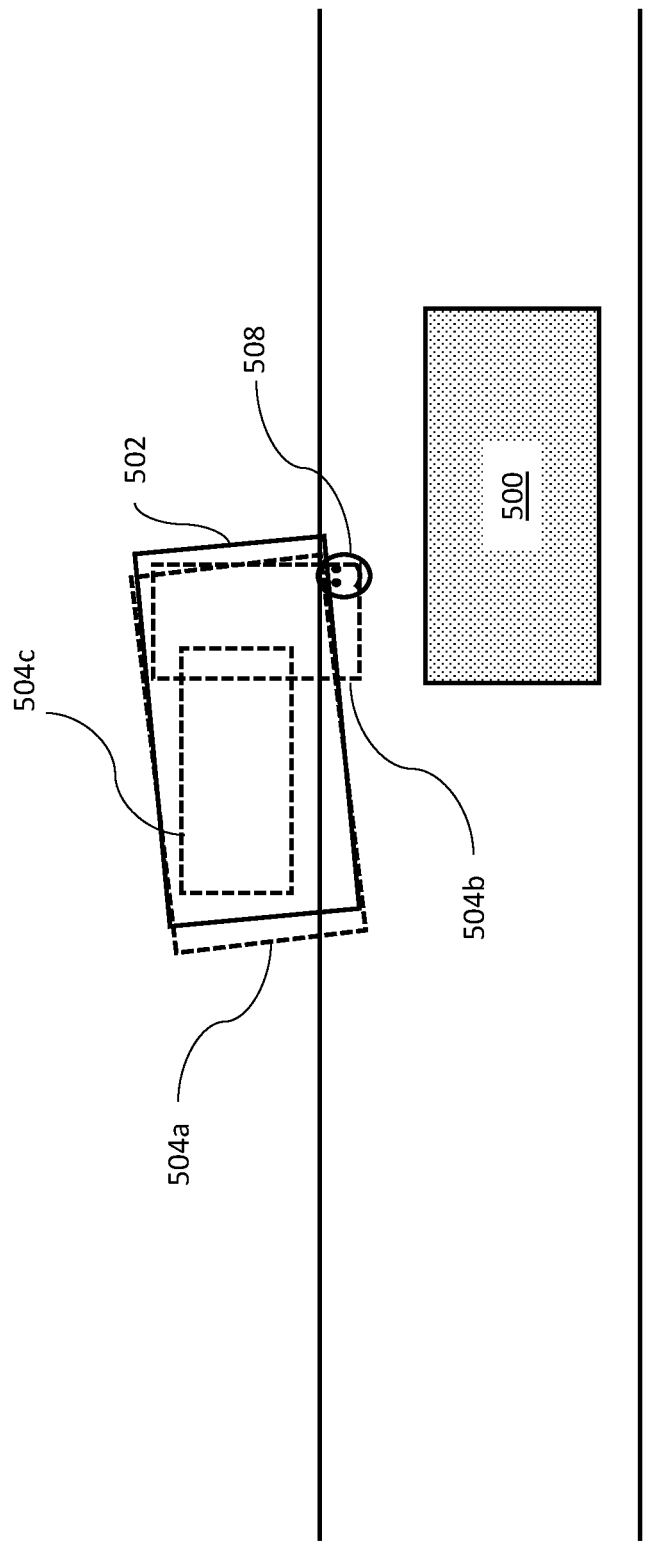
FIG. 5 illustrates results of an example segmentation process performed by a segmentation system according to some embodiments of the present disclosure.

In certain autonomous vehicle control systems, segmentation may be used to analyze a LIDAR point cloud and to segment, or to cluster, points into distinct objects, which are often represented as boxes. The segmentation information (e.g., the boxes) is provided to a tracking system for use in prediction and planning for the autonomous vehicle. In some instances, the segmentation process may suffer from inherent limitations with respect to segmenting objects, due in large part to occlusion issues. For example, as represented in FIG. 5, in which an autonomous vehicle 500 includes multiple onboard LIDAR sensors for generating a point cloud to be analyzed by a segmentation module, due to inherent limitations of certain segmentation processes, a single vehicle 502 may be represented by the segmentation data provided to the tracker module as comprising three separate objects 504a-504c. This issue may result from the fact that multiple LIDARs are in use and each LIDAR has blind spots such that occlusions cause the single object 502 to be perceived as multiple separate objects 504a-504c. Additionally, unrelated objects may be lumped together by the segmentation module, such that a pedestrian 508 may be represented as comprising a part of the object 504b rather than as a separate object.

Both of the aforementioned issues may cause critical errors in functionality of the autonomous vehicle planning and control systems. In the first situation, the autonomous vehicle may be caused to respond to an object that does not actually exist and/or is not moving (e.g., by unnecessarily hard-braking). In the second case, the autonomous vehicle may be prevented from responding appropriately to an object that actually exists (e.g., a pedestrian).

Additionally, in certain autonomous vehicle control systems, the tracking system only infers velocity from position deltas of the segmentation boxes it is provided from the segmentation system. Incorrect associations, as illustrated in and described above with reference to FIG. 5, may result in incorrect position updates, which may in turn leads to incorrect velocity estimates.

Example 2D Occupancy Grid for Tracking Motion

In accordance with features of embodiments described herein, and to address the above-noted, as well as other, issues, a two-dimensional (2D) occupancy grid may be generated from the combined point cloud generated by onboard LIDARs of an autonomous vehicle.

Figure 6A:
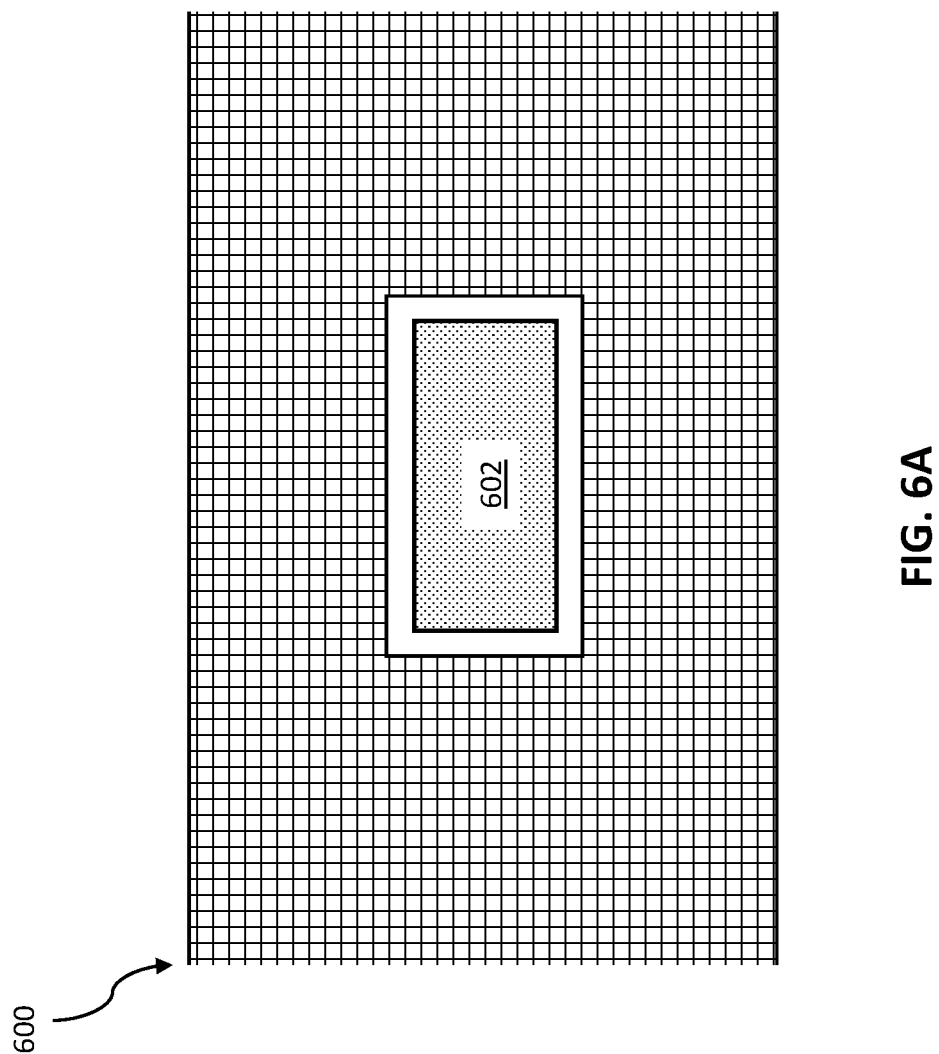
FIGS. 6A-6C illustrate the concepts of 2D and 3D occupancy and motion grids that may be employed according to some embodiments of the present disclosure.

Referring to FIG. 6A, an example 2D occupancy grid 600 may be generated for an autonomous vehicle 602 as described in greater detail below. Each cell 604 of the 2D occupancy grid 600 corresponds to a location relative to the autonomous vehicle and contains an indication as to whether the corresponding location is occupied, freespace, or unknown (perhaps occluded). It will be recognized that each frame of data comprising the LIDAR point cloud may be ray traced and processed as described in greater detail below to generate a 2D occupancy grid 600 for the autonomous vehicle for each frame and that, by comparing the cells of two 2D occupancy grids created from successive frames of LIDAR point cloud data corresponding to the same point in space, a determination may be made as to whether motion has occurred (i.e., the cell goes from occupied to freespace or from freespace to occupied). A speed with which the detected motion occurs may also be estimated based on the time that has elapsed between the two frames.

Additionally, a comparison of a sequence of multiple 2D occupancy grids over time may enable identification of objects comprising clusters of cells that appear to be "moving" at the same rate of speed and in the same direction. The result is an objective measure of motion that does not rely on segmentation. In particular, although it may be possible to identify clusters of cells, it is not necessary to do so. The identity or specific characteristic of the object in motion does not matter so much as the fact that motion is occurring. This solves the issue of phantom movement described above. It also addresses the issue of unrelated objects being lumped together; the occupancy grid enables detection of motion at different speeds, such that a pedestrian walking by a parked car will not simply be lumped in with the parked car.

Example 3D Motion Grid for Use in Tracking Motion

In accordance with features of embodiments described herein, and to further address the above-noted, as well as other, issues, a two-dimensional (3D) occupancy grid may be generated from the combined point cloud generated by onboard LIDARs of an autonomous vehicle.

Figure 6B:
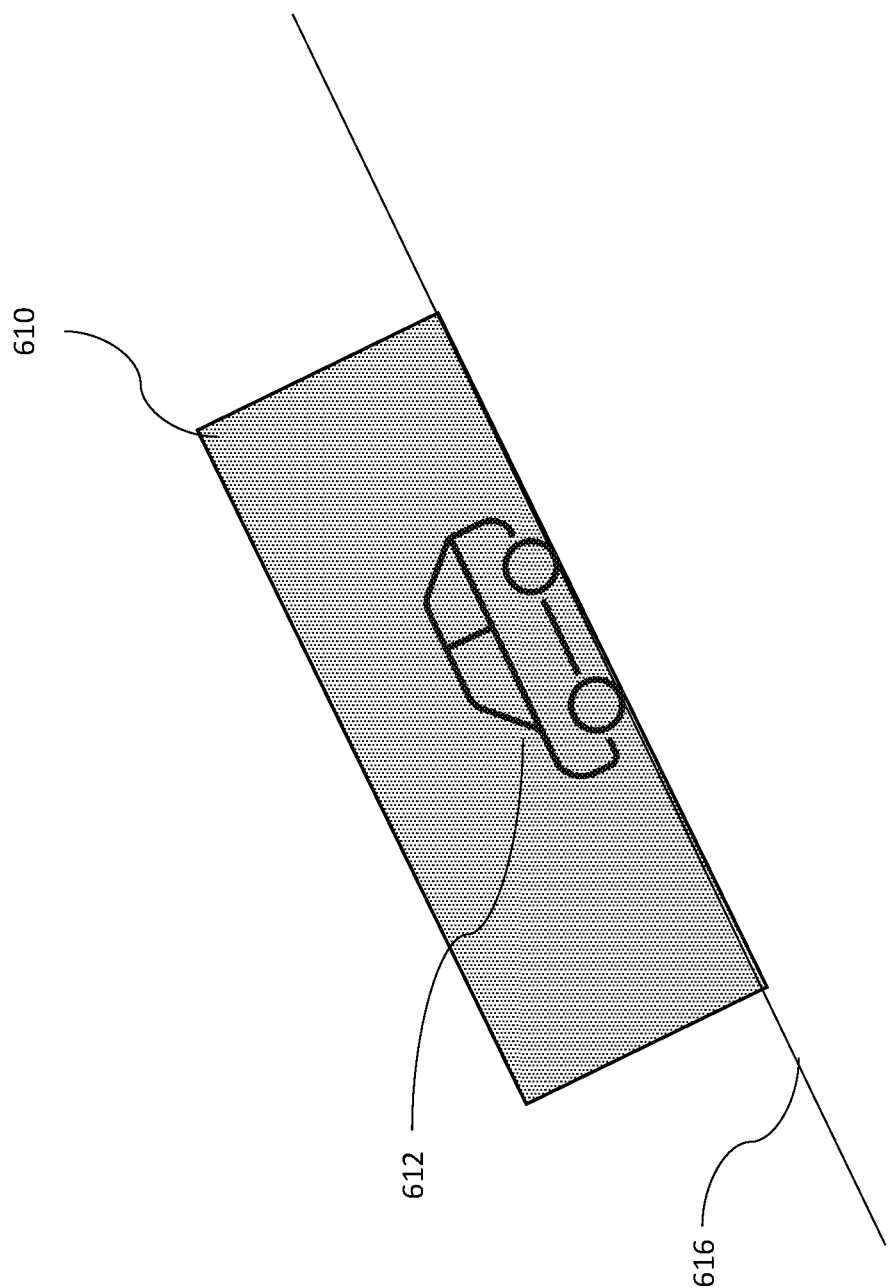
Figure 6C:
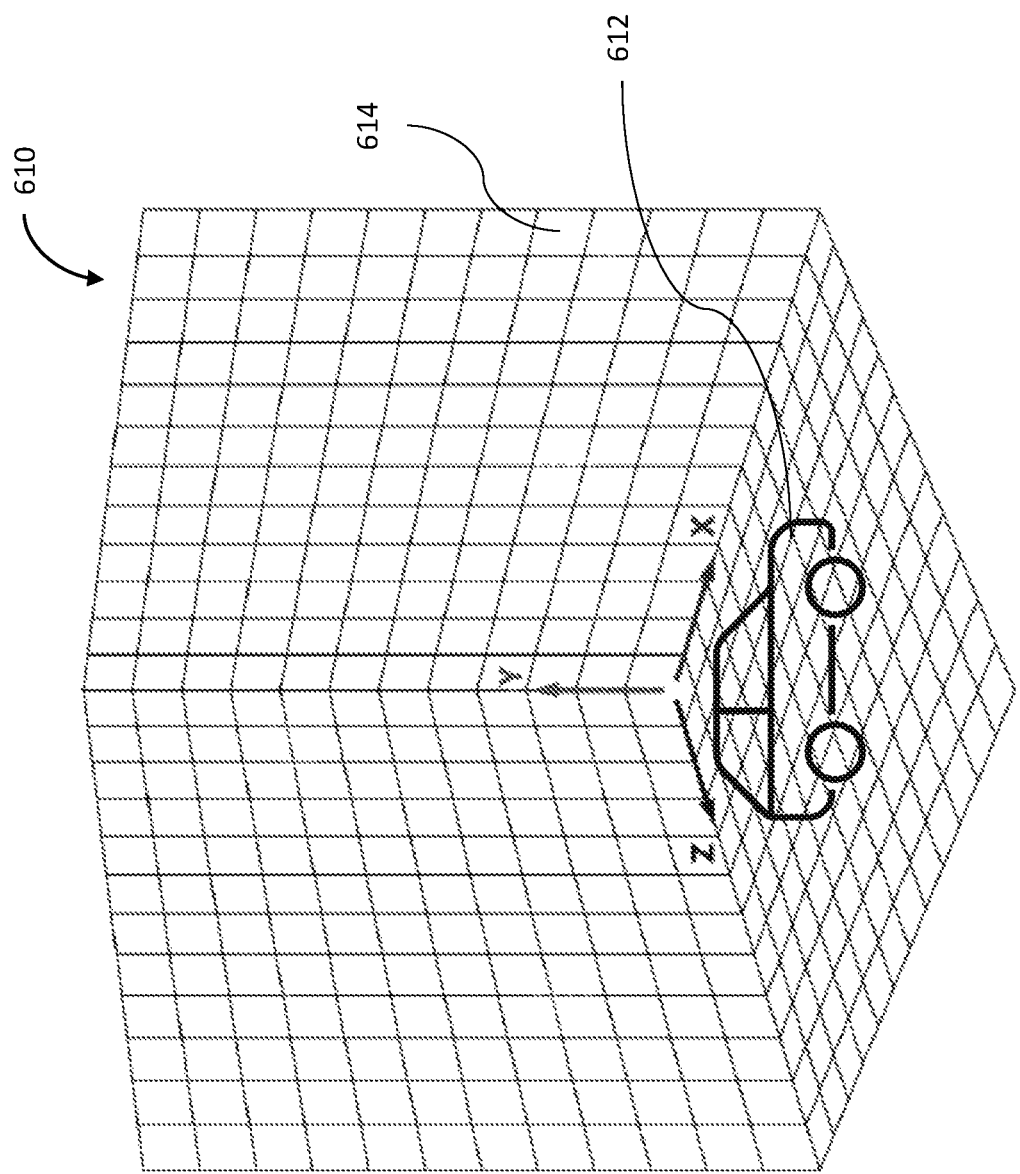

Referring to FIGS. 6B and 6C, an example 3D grid 610 may be generated for an autonomous vehicle 612 as described in greater detail below. In accordance with features of embodiments described herein, each cell 614 of the grid 610 comprises a "voxel." In the embodiment shown, the sides of the voxel are equal; however, it is anticipated that voxels having sides of different lengths may also be advantageously deployed in some embodiments. In a particular embodiment, the length of each side of a voxel 614 is 10 centimeters, although it will be recognized that other lengths may be used.

As best illustrated in FIG. 6B, the grid 610 is defined as having a particular height from ground level 616 and "travels" with the autonomous vehicle 612. In an example embodiment, the height of the grid can be 2 m-4 m and in some embodiments is one of 1.8 m, 2.0 m, 2.2 m, 2.4 m, 2.6 m, 2.8 m, 3.0 m, 3.2 m, . . . 4.2 m, etc.). The height of the voxels may be selected based on the general height of obstacles and the relevant spatial region. A corresponding number of voxels will be used in the grid, depending on the height of the grid and the height of the voxels. The height of the grid 610 may be selected such that only those objects that may affect or impede the movement of the autonomous vehicle 612 may be considered in a freespace analysis for perception and planning purposes. In the example embodiment, a particular height may be selected as being slightly taller than the height of an average autonomous vehicle; however, it will be recognized that taller or shorter grids may be defined without departing from the spirit or scope of embodiments described herein. Limiting the grid height further reduces the amount of LIDAR data that has to be processed by the 3D motion grid system to produce the 3D grid for a frame of LIDAR data. Additionally, the height of the grid may be selected in order to optimally leverage the architecture of the GPU used to implement the 3D motion grid system.

Each voxel 614 of the 2D occupancy grid 600 corresponds to a location relative to the autonomous vehicle and has associated therewith an indication as to the occupancy status of the corresponding location. For example, a voxel may be indicated as being occupied, freespace, unknown (perhaps occluded), ground (corresponding to the actual surface on which the vehicle is driving if that surface is not otherwise occupied), and/or overhang (corresponding to an object such as a tree branch that "appears" above several voxels of freespace. It will be recognized that each frame of data comprising the LIDAR point cloud may be ray traced and processed as described in greater detail below to generate a 3D occupancy grid, as well as a corresponding 2D occupancy grid, for the autonomous vehicle for each frame and that, by comparing cells of two 3D occupancy grids created from successive frames of LIDAR point cloud data corresponding to the same location in space, a determination may be made as to whether motion has occurred (e.g., occupancy characterization of a voxel associated with a particular location in space transitions from occupied to freespace or from freespace to occupied). A speed with which the detected motion occurs may also be estimated based on the time that has elapsed between the two frames.

Additionally, a comparison of a sequence of multiple 3D occupancy grids over time may enable identification of objects comprising clusters of cells that appear to be "moving" at the same rate of speed and in the same direction. The result is an objective measure of motion that does not rely on segmentation. In particular, although it may be possible to identify clusters of cells, it is not necessary to do so. The identity or specific characteristic of the object in motion do not matter so much as the fact that motion is occurring. This solves the issue of phantom movement described above. It also addresses the issue of unrelated objects being lumped together; the occupancy grid enables detection of motion at different speeds, such that a pedestrian walking by a parked car will not simply be lumped in with the parked car.

Example Methods for a 3D Motion Grid System

Figure 7:
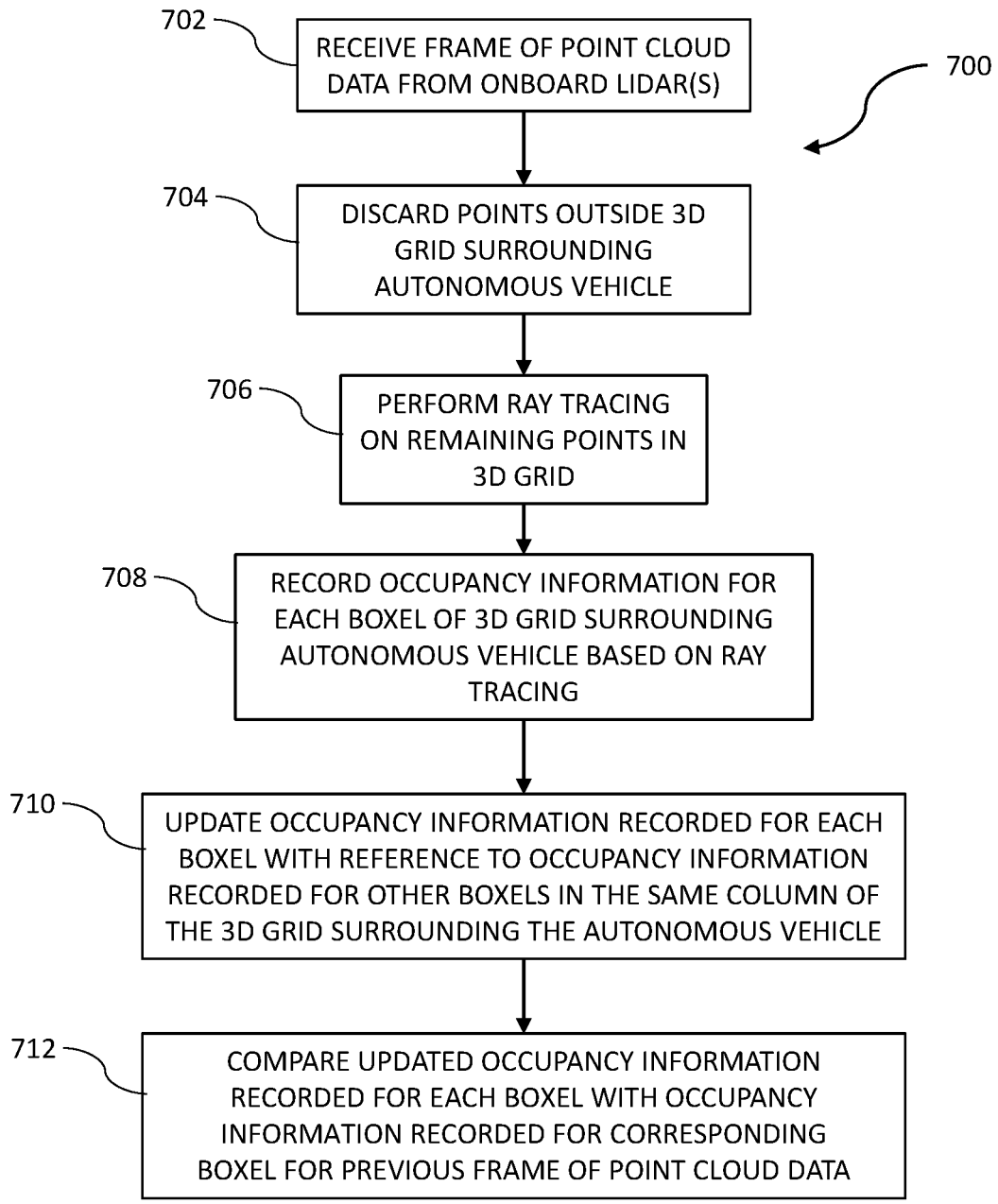
FIGS. 7 and 8 are flowcharts illustrating example operations that may be performed according to some embodiments of the present disclosure.
Figure 8:
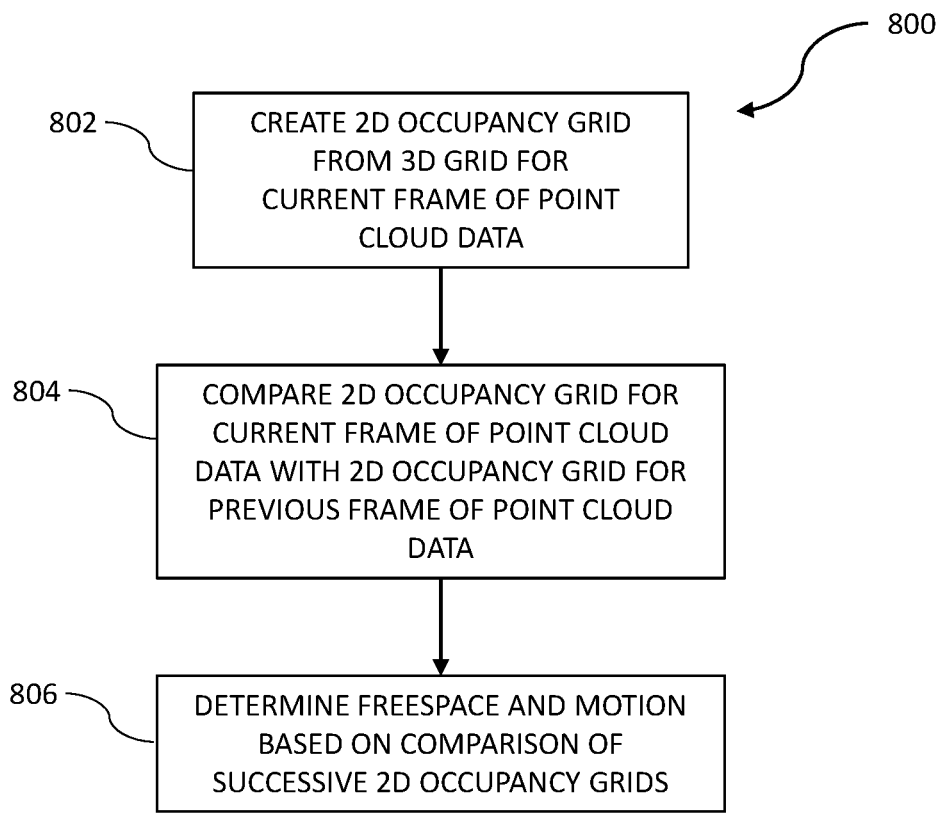

FIGS. 7-8 are flowcharts illustrating example processes for a 3D motion grid system for an autonomous vehicle according to some embodiments of the present disclosure. One or more of the steps illustrated in FIGS. 7-8 may be executed by one or more of the elements shown in the preceding figures.

FIG. 7 is a flowchart illustrating an example method 700 for a 3D motion grid system for an autonomous vehicle control system in accordance with features of embodiments described herein.

In step 702, a frame of point cloud data is received from onboard LIDARs of the autonomous vehicle. In the example embodiment, the autonomous vehicle includes two LIDAR sensors; however, it will be recognized that more or fewer LIDARs may be deployed without departing from the spirit or scope of embodiments descried herein.

In step 704, points in the point cloud that are outside of the 3D grid defined for the autonomous vehicle are discarded from the data. For example, assuming the maximum height of the 3D grid is defined as X meters from the ground, all points in the point cloud that have a height from ground (e.g., as indicated in the point cloud data) of more than X meters are discarded as unnecessary. This operation reduces the amount of data that must be processed by the 3D motion grid system without negatively impacting the freespace determination for the autonomous vehicle.

In step 706, ray tracing is performed on the remaining (i.e., non-discarded) points in the 3D grid to determine an occupancy characterization for each voxel (e.g., freespace, occupied, ground, overhang, etc.). In accordance with particular embodiments described herein, rays or beams may be parallel processed in groups of 32 beams/rays in order to maximize the operation, architecture, and shared memory operations of a particular GPU, such as a CUDA GPU in which parallel processing is based on 32 threads.

In step 708, the determined occupancy characterization for each voxel is stored in an associated location in memory. In one example embodiment, four 32-bit integers may be used to characterize each column of 32 voxels in the grid, potentially to leverage and optimize the architecture of a GPU that may be used to process the data. In this example embodiment, the occupancy characterization of each voxel may be represented by four bits, each of which is associated with a particular characterization (e.g., freespace, occupied, ground, overhang), with each bit being turned ON (e.g., 1) or OFF (e.g., 0) depending on the occupancy characterization. For example, in one embodiment, the bits associated with a voxel characterized as "freespace" would be set to 1000; the bits associated with a voxel characterized as "occupied" would be set to 0100; the bits associated with a voxel characterized as "ground" would be set to 0010; and the bits associated with a voxel characterized as "overhang" would be set to 0001. It will be recognized that a voxel characterized as "ground" corresponds to a point in the point cloud of less than a designated maximum height. The purpose of the "ground" characterization is to distinguish the surface that the autonomous vehicle is traversing from an obstacle or object on the surface that would impede traversal by the autonomous vehicle. Similarly, the purpose of the "overhang" characterization is to aid in identifying objects that "appear" at the top of a column seemingly out of nowhere, such as might occur in the case of a tree limb overhanging the surface on which the autonomous vehicle is traversing.

In another example embodiment, 16-bit integers may be used to characterize each column of 16 voxels in the grid, potentially to leverage and optimize the architecture of a GPU that may be used to process the data. In this example embodiment, the occupancy characterization of each voxel may be represented by four bits, each of which is associated with a particular characterization (e.g., freespace, occupied, ground, overhang), with each bit being turned ON (e.g., 1) or OFF (e.g., 0) depending on the occupancy characterization, in a manner similar to that described above with respect to the previous example.

Once all of the voxels for the frame of data are characterized, execution proceeds to step 710.

In step 710, the 3d occupancy grid may be further processed to update the characterization of each voxel based on the characterization of other voxels in the same column of voxels. For example, a voxel originally characterized as "occupied" may be recharacterized as "overhang" after further processing reveals that several or all of the voxels immediately below the voxel are characterized as "freespace." In another example, where a characterization of "unknown" may be available, a voxel originally characterized as "unknown" may be recharacterized as "occupied" if the voxels immediately above and immediately below the voxel are characterized occupied or as "freespace" if the voxels immediately above and immediately below the voxel are characterized as freespace.

In step 712, a voxel-by-voxel comparison of the current 3D occupancy grid with the immediately preceding 3D occupancy grid may performed and processed along with movement/location of the autonomous vehicle to detect motion with respect to each voxel corresponding to a particular point in space and across the grid space. This enables detection of direction as well as approximate speed of motion. Over time, with enough data, it may also be possible to identify objects, which will be recognizable as clusters of voxels moving at the same speed and in the same direction.

FIG. 8 is a flowchart illustrating an example method 800 for generating a 2D occupancy grid for an autonomous vehicle control system in accordance with features of embodiments described herein.

In step 802, a 2D occupancy grid is created from a 3D occupancy grid for a current frame of point cloud data. In one embodiment, the 2D motion grid may be created by assigning an occupancy characterization to each cell of the 2D grid that represents the collective occupancy characteristics of a column of the 3D occupancy grid corresponding to the cell of the 2D occupancy grid. For example, if a first voxel in the corresponding column is characterized as ground and the remaining voxels in the corresponding column are characterized as freespace, then the cell of the 2D occupancy grid may accurately be characterized as freespace. Expanding on the previous example, if the uppermost voxel of the aforementioned column is characterized as overhang, then once again the cell of the 2D occupancy grid may accurately be characterized as freespace. In contrast, if instead of being characterized as freespace, a certain minimum number of the voxels disposed between the bottom-most and upper-most voxels in the column are characterized as occupied, then the corresponding cell of the 2D occupancy grid may most accurately be characterized as occupied.

In step 804, a cell-by-cell comparison of the 2D occupancy grid created in step 802 with the 2D occupancy grid for the previous frame of point cloud data is performed. It will be recognized that in certain embodiments the cell of a first grid is compared with a cell of the second grid that corresponds to the same geographic location.

In step 806, the comparison performed in step 806 may be used to perform freespace and motion analyses by the control system of the autonomous vehicle.

It will be recognized from the methods illustrated in FIGS. 7 and 8 that 2D or 3D occupancy grids may find application in performing motion detection and freespace planning in connection with control of an autonomous vehicles depending on the particular embodiment and purpose.

Although the operations of the example methods shown in FIGS. 7-8 are illustrated as occurring once each and in a particular order, it will be recognized that the operations may be performed in any suitable order and repeated as desired. Additionally, one or more operations may be performed in parallel. Furthermore, the operations illustrated in FIGS. 7-8 may be combined or may include more or fewer details than described.

SELECT EXAMPLES

Example 1 provides a method including receiving a frame of point cloud data from at least one onboard light detection and ranging (LIDAR) sensor of an autonomous vehicle; discarding points of the received frame of point cloud data that are outside a defined geographic area around the autonomous vehicle; subsequent to the discarding, performing ray tracing in connection with the remaining points of the received frame of point cloud data; and characterizing an occupancy condition of each of a plurality of cells of a three-dimensional (3D) grid corresponding to the defined geographic area based on the ray tracing of the received frame of point cloud data, wherein the 3D grid corresponds to the received frame of point cloud data.

Example 2 provides the method of example 1 further, including comparing the 3D grid to a 3D grid corresponding to a previous frame of point cloud data to determine motion of an object with the defined geographic area.

Example 3 provides the method of any of examples 1 and 2, further including providing the 3D grid to a tracking system for the autonomous vehicle.

Example 4 provides the method of any of examples 1-3, wherein the cell comprises a 3D cell and each column of the 3D grid comprises a plurality of 3D cells.

Example 5 provides the method of any of examples 1-4, wherein the occupancy condition of one of the cells comprises at least one of occupied and freespace.

Example 6 provides the method of example 5, wherein the occupancy condition of one of the cells comprises at least one of overhang and ground.

Example 7 provides the method of any of examples 1-6, wherein the motion comprises a direction of movement.

Example 8 provides the method of any of examples 1-7, wherein the motion comprises a speed of movement.

Example 9 provides the method of any of examples 1-8, wherein the ray tracing and characterizing is performed using a graphics processing unit (GPU).

Example 10 provides the method of example 9, wherein the ray tracing is performed using parallel processing.

Example 11 provides the method of any of examples 1-10, further including converting the 3D grid into a two-dimensional (2D) occupancy grid, wherein each cell of the 2D occupancy grid comprises a consolidation of the cells of a corresponding column of the 3D grid.

Example 12 provides the method of example 11, further including comparing the 2D occupancy grid with an immediately preceding 2D occupancy grid to detect motion of an object over time within a geographic area represented by the 2D occupancy grid.

Example 13 provides the method of any of examples 1-12, wherein the discarding points of the received frame of point cloud data that are outside the defined geographic area comprises discarding points that are indicated as corresponding to a point in space located above a maximum height above a ground level.

Example 14 provides a method including generating for a first frame of a light detection and ranging (LIDAR) point cloud for an autonomous vehicle a first grid corresponding to a geographic area around the autonomous vehicle, the first grid including a first plurality of cells each having associated therewith an occupancy condition; generating for a second frame of the LIDAR point cloud a second grid representing the geographic area around the autonomous vehicle, the second grid including a second plurality of cells each having associated therewith an occupancy condition; and performing a cell-by-cell comparison of the first and second grids to infer motion from relative occupancy conditions of the first plurality of cells and the second plurality of cells.

Example 15 provides the method of example 14, wherein the first and second grids comprise three-dimensional (3D) grids and the geographic area has a maximum height above a ground level.

Example 16 provides the method of any of examples 14-15, wherein the first and second grids comprise two dimensional (2D) grids.

Example 17 provides the method of any of examples 14-16, wherein the occupancy condition comprises at least one of an occupied condition, a freespace condition, an occluded condition, a ground condition and an overhang condition.

Example 18 provides a control system for an autonomous vehicle, the control system comprising a plurality of onboard light ranging and detection (LIDAR) sensors for generating LIDAR data comprising a frame of a point cloud related to an environment of the autonomous vehicle; and a motion grid module comprising a graphics processing unit (GPU) configured to discard points of the point cloud frame that fall outside a defined geographic area around the autonomous vehicle; subsequent to the discarding, process the remaining points using ray tracing to characterize an occupancy condition of each of a plurality of cells of a three-dimensional (3D) grid corresponding to the defined geographic area, wherein the 3D grid corresponds to the point cloud data frame; and convert the 3D grid to a two-dimensional (2D) grid, wherein each of a plurality of cells of the 2D grid represents a collective occupancy condition of a portion of the plurality of cells comprising a corresponding column of the 3D grid.

Example 19 provides the control system of example 18, further including providing at least one of the 3D grid and the 2D grid to a tracking system for the autonomous vehicle.

Example 20 provides the control system of any of examples 18-19, wherein the occupancy condition includes at least one of an occupied condition, a freespace condition, an occluded condition, an overhang condition, and a ground condition.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the interior electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as exterior storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended examples. The specifications apply only to one non-limiting example and, accordingly, they should be construed as such. In the foregoing description, example embodiments have been described with reference to particular arrangements of components. Various modifications and changes may be made to such embodiments without departing from the scope of the appended examples. The description and drawings are, accordingly, to be regarded in an illustrative rather than in a restrictive sense.

Note that with the numerous examples provided herein, interaction may be described in terms of two, three, four, or more components; however, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Various operations may be described as multiple discrete actions or operations in turn in a manner that is most helpful in understanding the example subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended examples. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the examples appended hereto, Applicant wishes to note that the Applicant: (a) does not intend any of the appended examples to invoke paragraph (f) of 35 U.S.C. Section 112 as it exists on the date of the filing hereof unless the words "means for" or "step for" are specifically used in the particular examples; and (b) does not intend, by any statement in the Specification, to limit this disclosure in any way that is not otherwise reflected in the appended examples.

What is claimed is:

1. A method comprising:
receiving a frame of point cloud data from at least one onboard light detection and ranging (LIDAR) sensor of a vehicle;
discarding points of the received frame of point cloud data that are outside a defined geographic area around the vehicle;
subsequent to the discarding, performing ray tracing in connection with the remaining points of the received frame of point cloud data;
characterizing an occupancy condition of each of a plurality of cells of a three-dimensional (3D) grid corresponding to the defined geographic area based on the ray tracing of the received frame of point cloud data as one of occupied, freespace, overhang, and unknown, wherein the 3D grid corresponds to the received frame of point cloud data; and
recharacterizing the occupancy condition of a cell in the plurality cells of the 3D grid based on the occupancy condition of another cell in a same column as the cell in the 3D grid.

2. The method of claim 1, further comprising comparing the 3D grid to a 3D grid corresponding to a previous frame of point cloud data to determine motion of an object within the defined geographic area by determining whether a status of the cell of the 3D grid has toggled between freespace and occupied or toggled between occupied and freespace.

3. The method of claim 1, further comprising providing the 3D grid to a tracking system for the vehicle.

4. The method of claim 1, wherein the cell comprises a 3D cell and each column of the 3D grid comprises a plurality of 3D cells.

5. The method of claim 1, wherein the occupancy condition of one of the cells comprises at least one of occupied and freespace.

6. The method of claim 5, wherein the occupancy condition of the cell has an occupancy condition recharacterized to overhang when the occupancy condition of the cell is initially characterized as occupied and the another cell is below the cell and is characterized as freespace.

7. The method of claim 1, wherein the motion comprises a direction of movement.

8. The method of claim 1, wherein the motion comprises a speed of movement.

9. The method of claim 1, wherein the ray tracing and characterizing is performed using a graphics processing unit (GPU).

10. The method of claim 9, wherein the ray tracing is performed using parallel processing.

11. The method of claim 1, further comprising converting the 3D grid into a two-dimensional (2D) occupancy grid, wherein each cell of the 2D occupancy grid comprises a consolidation of the cells of a corresponding column of the 3D grid.

12. The method of claim 11, further comprising comparing the 2D occupancy grid with an immediately preceding 2D occupancy grid to detect motion of an object over time within a geographic area represented by the 2D occupancy grid.

13. The method of claim 1, wherein the discarding points of the received frame of point cloud data that are outside the defined geographic area comprises discarding points that are indicated as corresponding to a point in space located above a maximum height above a ground level, wherein the maximum height above the ground is based on a height of the vehicle.

14. A control system for a vehicle, the control system comprising:
   a plurality of onboard light ranging and detection (LIDAR) sensors for generating LIDAR data comprising a frame of a point cloud related to an environment of the vehicle; and
   a motion grid module comprising a graphics processing unit (GPU) configured to:
   discard points of the point cloud frame that fall outside a defined geographic area around the vehicle;
   subsequent to the discarding, process the remaining points using ray tracing to characterize an occupancy condition of each of a plurality of cells of a three-dimensional (3D) grid corresponding to the defined geographic area, wherein the 3D grid corresponds to the point cloud data frame as one of occupied, freespace, overhang, and unknown recharacterize a cell in the plurality cells of the 3D grid based on the characterizations of other cells in a same column as the cell in the 3D grid; and
   convert the 3D grid to a two-dimensional (2D) grid, wherein each of a plurality of cells of the 2D grid represents a collective occupancy condition of a portion of the plurality of cells comprising a corresponding column of the 3D grid.

15. The control system of claim 14, further comprising providing at least one of the 3D grid and the 2D grid to a tracking system for the vehicle.

16. The control system of claim 14, wherein the occupancy condition comprises at least one of an occupied condition, a freespace condition, an occluded condition, an overhang condition, and a ground condition.

* * * * *